(12) United States Patent
Maloof

(10) Patent No.: US 8,037,535 B2
(45) Date of Patent: Oct. 11, 2011

(54) SYSTEM AND METHOD FOR DETECTING MALICIOUS EXECUTABLE CODE

(75) Inventor: Marcus A. Maloof, Cabin John, MD (US)

(73) Assignee: Georgetown University, Washington, DC (US)

( * ) Notice: Subject to any disclaimer, the term of this patent is extended or adjusted under 35 U.S.C. 154(b) by 1396 days.

(21) Appl. No.: 11/202,186

(22) Filed: Aug. 12, 2005

(65) Prior Publication Data
US 2006/0037080 A1 Feb. 16, 2006

Related U.S. Application Data

(60) Provisional application No. 60/601,164, filed on Aug. 13, 2004.

(51) Int. Cl.
*G06F 12/16* (2006.01)
(52) U.S. Cl. .......................................... 726/24; 713/188
(58) Field of Classification Search .................... 726/24; 713/188
See application file for complete search history.

(56) References Cited

U.S. PATENT DOCUMENTS

| | | | |
|---|---|---|---|
| 7,089,241 B1 * | 8/2006 | Alspector et al. ................. 707/7 |
| 7,293,063 B1 * | 11/2007 | Sobel ............................ 709/206 |
| 7,487,544 B2 * | 2/2009 | Schultz et al. .................. 726/24 |
| 7,519,998 B2 * | 4/2009 | Cai et al. ......................... 726/24 |

OTHER PUBLICATIONS

Schultz et al., Data Mining Methods for Detection of New Malicious Executables, 2001 IEEE (pp. 38-49].*

* cited by examiner

*Primary Examiner* — Kambiz Zand
*Assistant Examiner* — Amare F Tabor
(74) *Attorney, Agent, or Firm* — Buchanan Ingersoll & Rooney, P.C.

(57) ABSTRACT

A system and method for detecting malicious executable software code. Benign and malicious executables are gathered; and each are encoded as a training example using n-grams of byte codes as features. After selecting the most relevant n-grams for prediction, a plurality of inductive methods, including naive Bayes, decision trees, support vector machines, and boosting, are evaluated.

19 Claims, 4 Drawing Sheets

SYSTEM AND METHOD FOR DETECTING MALICIOUS EXECUTABLE CODE

CROSS-REFERENCE TO PROVISIONAL APPLICATION

This application claims priority under 35 U.S.C. §119 of provisional application Ser. No. 60/601,164, filed Aug. 13, 2004, hereby expressly incorporated by reference and assigned to the assignee hereof.

The work described herein was made with government support under a United States Government prime contract through The MITRE Corporation.

The United States Government may have certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights, whatsoever.

BACKGROUND OF THE INVENTION

1. Field of Exemplary Embodiments

Exemplary embodiments relate generally to software code and, more specifically, to systems and methods for detecting malicious executable software code.

2. Description of Background and/or Related and/or Prior Art

Malicious code is "any code added, changed, or removed from a software system to intentionally cause harm or subvert the system's intended function". Such software has been used to compromise computer systems, to destroy their information, and to render them useless. It has also been used to gather information, such as passwords and credit card numbers, and to distribute information, such as pornography, all without the knowledge of the system's users. As more novice users obtain sophisticated computers with high-speed connections to the Internet, the potential for further abuse is great.

Malicious executables generally fall into three categories based on their transport mechanism: viruses, worms, and Trojan horses. Viruses inject malicious code into existing programs, which become "infected" and, in turn, propagate the virus to other programs when executed. Viruses come in two forms, either as an infected executable or as a virus loader, a small program that only inserts viral code. Worms, in contrast, are self-contained programs that spread over a network, usually by exploiting vulnerabilities in the software running on the networked computers. Finally, Trojan horses masquerade as benign programs, but perform malicious functions. Malicious executables do not always fit neatly into these categories and can exhibit combinations of behaviors.

Excellent technology exists for detecting known malicious executables. Software for virus detection has been quite successful, and programs such as McAfee Virus Scan and Norton AntiVirus are ubiquitous. Indeed, Dell recommends Norton Anti Virus for all of its new systems. Although these products use the word virus in their names, they also detect worms and Trojan horses.

These programs search executable code for known patterns, and this method is problematic. One shortcoming is that we must obtain a copy of a malicious program before extracting the pattern necessary for its detection. Obtaining copies of new or unknown malicious programs usually entails them infecting or attacking a computer system.

To complicate matters, writing malicious programs has become easier: There are virus kits freely available on the Internet. Individuals who write viruses have become more sophisticated, often using mechanisms to change or obfuscate their code to produce so-called polymorphic viruses. Indeed, researchers have recently discovered that simple obfuscation techniques foil commercial programs for virus detection. These challenges have prompted some researchers to investigate learning methods for detecting new or unknown viruses, and more generally, malicious code.

There have been few attempts to use machine learning and data mining for the purpose of identifying new or unknown malicious code. These have concentrated mostly on PC viruses, thereby limiting the utility of such approaches to a particular type of malicious code and to computer systems running Microsoft's Windows operating system. Such efforts are of little direct use for computers running the UNIX operating system, for which viruses pose little threat. However, the methods proposed are general, meaning that they could be applied to malicious code for any platform, and presently, malicious code for the Windows operating system poses the greatest threat.

In an early attempt, Lo et al. conducted an analysis of several programs—evidently by hand—and identified telltale signs, which they subsequently used to filter new programs. While we appreciate their attempt to extract patterns or signatures for identifying any class of malicious code, they presented no experimental results suggesting how general or extensible their approach might be. Researchers at IBM'S T.J. Watson Research Center have investigated neural networks for virus detection and have incorporated a similar approach for detecting boot-sector viruses into IBM's Anti-Virus software.

More recently, instead of focusing on boot-sector viruses, Schultz et al. used data mining methods, such as naive Bayes, to detect malicious code. The Schultz et al. article is "Data Mining Methods for Detection of New Malicious Executables," in *Proceedings of the IEEE Symposium on Security and Privacy*, pages 38-49, Los Alamitos, Calif., 2001, IEEE Press, the contents of which are incorporated herein by reference. The authors collected 4,301 programs for the Windows operating system and used McAfee Virus Scan to label each as either malicious or benign. There were 3,301 programs in the former category and 1,000 in the latter. Of the malicious programs, 95% were viruses and 5% were Trojan horses. Furthermore, 38 of the malicious programs and 206 of the benign programs were in the Windows Portable Executable (PE) format.

For feature extraction, the authors used three methods: binary profiling, string sequences, and so-called hex dumps. The authors applied the first method to the smaller collection of 244 executables in the Windows PE format and applied the second and third methods to the full collection.

The first method extracted three types of resource information from the Windows executables: (1) a list of Dynamically Linked Libraries (DLLs), (2) functions calls from the DLLs, and (3) the number of different system calls from within each DLL. For each resource type, the authors constructed binary feature vectors based on the presence or absence of each in the executable. For example, if the collection of executables used ten DLLs, then they would characterize each as a binary vector of size ten. If a given executable used a DLL, then they would set the entry in the executable's vector corresponding to that DLL to one. This processing resulted in 2,229 binary features, and in a similar manner, they encoded function calls and their number, resulting in 30 integer features.

The second method of feature extraction used the UNIX strings command, which shows the printable strings in an object or binary file. The authors formed training examples by treating the strings as binary attributes that were either present in or absent from a given executable.

The third method used the hexdump utility, which is similar to the UNIX octal dump (od -x) command. This printed the contents of the executable file as a sequence of hexadecimal numbers. As with the printable strings, the authors used two-byte words as binary attributes that were either present or absent.

After processing the executables using these three methods, the authors paired each extraction method with a single learning algorithm. Using five-fold cross-validation, they used RIPPER to learn rules from the training set produced by binary profiling. They used naive Bayes to estimate probabilities from the training set produced by the strings command. Finally, they used an ensemble of six naive-Bayesian classifiers on the hexdump data by training each on one-sixth of the lines in the output file. The first learned from lines 1, 6, 12 ... ; the second, from lines 2, 7, 13, ... ; and so on. As a baseline method, the authors implemented a signature-based scanner by using byte sequences unique to the malicious executables.

The authors concluded, based on true-positive (TP) rates, that the voting naive Bayesian classifier outperformed all other methods, which appear with false-positive (FP) rates and accuracies in Table 1. The authors also presented receiver operating characteristic (ROC) curves, but did not report the areas under these curves. Nonetheless, the curve for the single naive Bayesian classifier appears to dominate that of the voting naive Bayesian classifier in most of the ROC space, suggesting that the best performing method was actually naive Bayes trained with strings.

TABLE 1

Results from the study conducted by Schultz et al.

| Method | TP Rate | FP Rate | Accuracy (%) |
| --- | --- | --- | --- |
| Signature + hexdump | 0.34 | 0.00 | 49.31 |
| RIPPER + DLLs used | 0.58 | 0.09 | 83.61 |
| RIPPER + DLL function used | 0.71 | 0.08 | 89.36 |
| RIPPER + DLL function counts | 0.53 | 0.05 | 89.07 |
| Naïve Bayes + strings | 0.97 | 0.04 | 97.11 |
| Voting Naïve Bayes + hexdump | 0.98 | 0.06 | 96.88 |

However, as the authors discuss, one must question the stability of DLL names, function names, and string features. For instance, one may be able to compile a source program using another compiler to produce an executable different enough to avoid detection. Programmers often use methods to obfuscate their code, so a list of DLLs or function names may not be available.

The authors paired each feature extraction method with a learning method, and as a result, RIPPER was trained on a much smaller collection of executables than were naive Bayes and the ensemble of naive-Bayesian classifiers.

There are other methods of guarding against malicious code, such as object reconciliation, which involves comparing current files and directories to past copies; one can also compare cryptographic hashes. One can also audit running programs and statically analyze executables using pre-defined malicious patterns. These approaches are not based on data mining, although one could imagine the role such techniques might play.

Researchers have also investigated classification methods for the determination of software authorship. Most notorious in the field of authorship are the efforts to determine whether Sir Frances Bacon wrote works attributed to Shakespeare, or who wrote the twelve disputed Federalist Papers, Hamilton or Madison. Recently, similar techniques have been used in the relatively new field of software forensics to determine program authorship. Gray et al. wrote a position paper on the subject of authorship, whereas Krsul conducted an empirical study by gathering code from programmers of varying skill, extracting software metrics, and determining authorship using discriminant analysis. There are also relevant results published in the literature pertaining to the plagiarism of programs, which we will not survey here.

Krsul collected 88 programs written in the C programming language from 29 programmers at the undergraduate, graduate, and faculty levels. He then extracted 18 layout metrics (e.g., indentation of closing curly brackets), 15 style metrics (e.g., mean line length), and 19 structure metrics (e.g., percentage of int function definitions). On average, Krsul determined correct authorship 73% of the time. Interestingly, of the 17 most experienced programmers, he was able to determine authorship 100% of the time. The least experienced programmers were the most difficult to classify, presumably because they had not settled into a consistent style. Indeed, they "were surprised to find that one [programmer] had varied his programming style considerably from program to program in a period of only two months".

While interesting, it is unclear how much confidence we should have in these results. Krsul used 52 features and only one or two examples for each of the 20 classes (i.e., the authors). This seems underconstrained, especially when rules of thumb suggest that one needs ten times more examples than features. On the other hand, it may also suggest that one simply needs to be clever about what constitutes an example. For instance, one could presumably use functions as examples rather than programs, but for the task of determining authorship of malicious programs, it is unclear whether such data would be possible to collect or if it even exists. Fortunately, as we discuss below, a lack of data was not a problem for our project.

SUMMARY OF THE INVENTION

Our efforts to address this problem have resulted in a fielded, computer-based software application, built using techniques from machine learning and data mining. Embodiments of the present Malicious Executable Classification System (MECS) described herein currently detect unknown malicious executables "in the wild", that is, without removing any obfuscation. Exemplary embodiments can be configured as a computer program product and/or a software encoded onto computer-readable medium for detecting malicious executable code. To date, we have gathered 1971 system and non-system executables, which we will refer to as "benign" executables, and 1651 malicious executables with a variety of transport mechanisms and payloads (e.g., key-loggers and backdoors). Although all were for the Windows operating system, it is important to note that our approach is not restricted to this operating system.

We extracted byte sequences from the executables, converted these into n-grams, and constructed several classifiers: IBk, TFIDF, naive Bayes, support vector machines (SVMs), decision trees, boosted naive Bayes, boosted SVMs, and boosted decision trees. In this domain, there is an issue of unequal but unknown costs of misclassification error, so we evaluated the methods using receiver operating characteristic (ROC) analysis, using area under the ROC curve as the performance metric. Ultimately, boosted decision trees outperformed all other methods with an area under the curve of 0.996.

Users interact with MECS on their computer through a command line. They can add new executables to the collection, update learned models, display ROC curves, and produce a single classifier at a specific operating point on a selected ROC curve.

In the discussion of exemplary embodiments below, we present empirical results from an extensive study of inductive methods for detecting malicious executables in the wild. We report on a fielded application developed using machine learning and data mining.

BRIEF DESCRIPTION OF THE DRAWINGS

These and other objects and advantages of the present invention will become more apparent and more readily appreciated from the following description of the preferred embodiments, taken in conjunction with the accompanying drawings, wherein like reference numerals have been used to designate like elements, and wherein.

Figure 1:
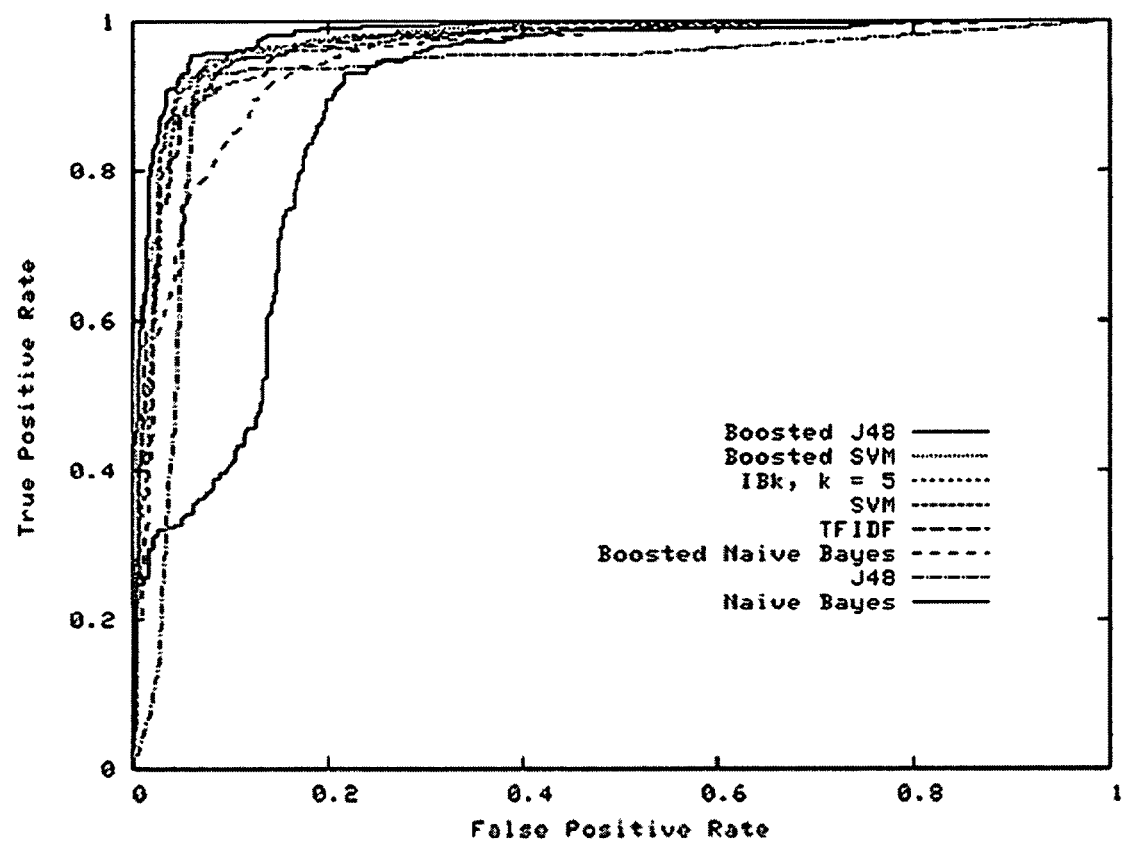
FIG. 1 shows receiver operating characteristic (ROC) curves for detecting malicious executable code in a smaller collection.

DETAILED DESCRIPTION OF BEST MODE AND SPECIFIC/PREFERRED EMBODIMENTS OF THE INVENTION

As stated previously, the data for our study consisted of 1971 benign executables and 1651 malicious executables. All were in the WINDOWS PE format. We obtained benign executables from all folders of machines running the WINDOWS 2000 and XP operating systems. We gathered additional applications from the Internet Web site of SourceForge.

We obtained viruses, worms, and Trojan horses from the Web site VX Heavens and from computer-forensic experts. Some executables were obfuscated with compression, encryption, or both; some were not, but we were not informed which were and which were not. For one collection, a commercial product for detecting viruses failed to identify 18 of the 114 malicious executables. Note that for viruses, we examined only the loader programs; we did not include infected executables in our study.

We used the hexdump utility to convert each executable to hexadecimal codes in an ASCII format. We then produced n-grams, by combining each four-byte sequence into a single term. For instance, for the byte sequence ff 00 ab 3e 12 b3, the corresponding n-grams would be ff00ab3e, 00ab3e12, and ab3e12b3. This processing resulted in 255,904,403 distinct n-grams. One could also compute n-grams from words, something we explored and discuss further below. Using the n-grams from all of the executables, we applied techniques from information retrieval and text classification, which we discuss further below.

Our overall approach drew techniques from information retrieval and from text classification. We used the n-grams extracted from the executables to form training examples by viewing each n-gram as a binary attribute that is either present in (i.e., 1) or absent from (i.e., 0) the executable. We selected the most relevant attributes (i.e., n-grams) by computing the information gain (IG) for each:

$$IG(j) = \sum_{v_j \in \{0,1\}} \sum_{C \in \{C_i\}} P(V_j, C) \log \frac{P(V_j, C)}{P(v_j)P(C)},$$

where C is the class, $v_j$ is the value of the jth attribute, $P(v_j, C)$ is the proportion that the jth attribute has the value $v_j$ in the class $C_i$, $P(v_j)$ is the proportion that the jth n-gram takes the value $v_j$ in the training data, $P(C)$ is the proportion of the training data belonging to the class C. This measure is also called average mutual information. We then selected a subset comprising the top 500 n-grams, a quantity we determined through pilot studies (see discussion below), and applied several learning methods: IBk, TFIDF, naive Bayes, a support vector machine (SVM), and a decision tree. We also "boosted" the last three of these learners, and we discuss each of these methods below.

One of the simplest learning methods is the instance-based (IB) learner. Its concept description is a collection of training examples or instances. Learning, therefore, is the addition of new examples to the collection. To classify an unknown instance, the performance element finds the example in the collection most similar to the unknown and returns the example's class label as its prediction for the unknown. For binary attributes, such as ours, a convenient measure of similarity is the number of values two instances have in common. Variants of this method, such as IBk, find the k most similar instances and return the majority vote of their class labels as the prediction. Values for k are typically odd to prevent ties. Such methods are also known as nearest neighbor and k-nearest neighbors.

For the TFIDF classifier, we followed a classical approach from information retrieval. We used the vector space model, which entails assigning to each executable (i.e., document) a vector of size equal to the total number of distinct n-grams (i.e., terms) in the collection. The components of each vector were weights of the top n-grams present in the executable. For the jth n-gram of the ith executable, the method computes the weight $w_{ij}$, defined as $$w_{ij} = tf_{ij} \times idf_j,$$

where $tf_{ij}$ (i.e., term frequency) is the number of times the ith n-gram appears in the jth executable and $$idf_j = \log \frac{d}{df_j}$$

(i.e., the inverse document frequency), where d is the total number of executables and $df_j$ is the number of executables that contain the jth n-gram. It is important to note that this classifier was the only one that used continuous attribute values; all others used binary attribute values.

To classify an unknown instance, the method uses the top n-grams from the executable, as described previously, to form a vector $\vec{u}$, the components of which are each n-gram's inverse document frequency (i.e., $u_j = idf_j$).

Once formed, the classifier computes a similarity coefficient (SC) between the vector for the unknown executable and each vector for the executables in the collection using the cosine similarity measure:

$$SC(\vec{u}, \vec{w}_i) = \frac{\sum_{j=1}^{k} u_j w_{ij}}{\sqrt{\sum_{j=1}^{k} u_j^2 \cdot \sum_{j=1}^{k} w_{ij}^2}},$$

where $\vec{u}$ is the vector for the unknown executable, $\vec{w}_i$ is the vector for the ith executable, and k is the number of distinct n-grams in the collection.

After selecting the top five closest matches to the unknown, the method takes a weighted majority vote of the executable labels, and returns the class with the least weight as the prediction. It uses the cosine measure as the weight. Since we evaluated the methods using ROC analysis, which requires case ratings, we summed the cosine measures of the negative executables in the top five, subtracted the sum of the cosine measures of the positive executables, and used the resulting value as the rating. In the following discussion, we will refer to this method as the TFIDF classifier.

Naive Bayes is a probabilistic method that has a long history in information retrieval and text classification. It stores as its concept description the prior probability of each class, $P(C_i)$, and the conditional probability of each attribute value given the class, $P(v_j|C_i)$. It estimates these quantities by counting in training data the frequency of occurrence of the classes and of the attribute values for each class. Then, assuming conditional independence of the attributes, it uses Bayes' rule to compute the posterior probability of each class given an unknown instance, returning as its prediction the class with the highest such value:

$$C = \underset{C_i}{\arg\max} \, P(C_i) \prod_j P(v_j | C_i).$$

For ROC analysis, we used the posterior probability of the negative class as the case rating.

Support vector machines (SVMs) have performed well on traditional text classification tasks, and performed well on ours. The method produces a linear classifier, so its concept description is a vector of weights, $\vec{w}$, and an intercept or a threshold, b. However, unlike other linear classifiers, such as Fisher's, SVMs use a kernel function to map training data into a higher dimensioned space so that the problem is linearly separable. It then uses quadratic programming to set $\vec{w}$ and b such that the hyperplane's margin is optimal, meaning that the distance is maximal from the hyperplane to the closest examples of the positive and negative classes. During performance, the method predicts the positive class if $(\vec{w} \cdot \vec{x}) - b > 0$ and predicts the negative class otherwise. Quadratic programming can be expensive for large problems, but sequential minimal optimization (SMO) is a fast, efficient algorithm for training SVMs. During performance, this implementation computes the probability of each class, and for ROC analysis, we used probability of the negative class as the rating.

A decision tree is a tree with internal nodes corresponding to attributes and leaf nodes corresponding to class labels. For symbolic attributes, branches leading to children correspond to the attribute's values. The performance element uses the attributes and their values of an instance to traverse the tree from the root to a leaf. It predicts the class label of the leaf node. The learning element builds such a tree by selecting the attribute that best splits the training examples into their proper classes. It creates a node, branches, and children for the attribute and its values, removes the attribute from further consideration, and distributes the examples to the appropriate child node. This process repeats recursively until a node contains examples of the same class, at which point, it stores the class label. Most implementations use the gain ratio for attribute selection, a measure based on the information gain. In an effort to reduce overtraining, most implementations also prune induced decision trees by removing subtrees that are likely to perform poorly on test data. WEKA's J48 is an implementation of the ubiquitous C4.5. During performance, J48 assigns weights to each class, and we used the weight of the negative class as the case rating.

Boosting is a method for combining multiple classifiers. Researchers have shown that ensemble methods often improve performance over single classifiers. Boosting produces a set of weighted models by iteratively learning a model from a weighted data set, evaluating it, and reweighting the data set based on the model's performance. During performance, the method uses the set of models and their weights to predict the class with the highest weight. We used the AdaBoost.M1 algorithm implemented in WEKA to boost SVM5, J48, and naive Bayes. As the case rating, we used the weight of the negative class. Note that we did not apply AdaBoost.M1 to IBk because of the high computational expense.

To evaluate the approaches and methods, we used stratified ten-fold cross-validation. That is, we randomly partitioned the executables into ten disjoint sets of equal size, selected one as a testing set, and combined the remaining nine to form a training set. We conducted ten such runs using each partition as the testing set.

For each run, we extracted n-grams from the executables in the training and testing sets. We selected the most relevant features from the training data, applied each classification method, and used the resulting classifier to rate the examples in the test set.

To conduct ROC analysis, for each method, we pooled the ratings from the iterations of cross-validation, and used labroc4 to produce an empirical ROC curve and to compute its area and the standard error of the area. With the standard error, we computed 95% confidence intervals.

We conducted three experimental studies using our data collection and experimental methodology, described previously. We first conducted pilot studies to determine the size of words and n-grams, and the number of n-grams relevant for prediction. Once determined, we applied all of the classification methods to a small collection of executables. We then applied the methodology to a larger collection of executables, all of which are described below.

We conducted pilot studies to determine three quantities: The size of n-grams, the size of words, and the number of selected features.

Using the experimental methodology described previously, we extracted bytes from 476 malicious executables and 561 benign executables and produced n-grams, for n=4. (This smaller set of executables constituted our initial collection, which we later supplemented.) We then selected the best 10, 20 . . . , 100, 200, . . . , 1000, 2000, . . . , 10,000 n-grams, and evaluated the performance of a SVM, boosted SVMs, naive Bayes, J48, and boosted J48. Selecting 500 n-grams produced the best results.

We fixed the number of n-grams at 500, and varied n, the size of the n-grams. We evaluated the same methods for n=1, 2, . . . , 10, and n=4 produced the best results. We also varied the size of the words (one byte, two bytes, etc.), and results suggested that single bytes produced better results than did multiple bytes.

And so by selecting the top 500 n-grams of size four produced from single bytes, we evaluated all of the classification methods on this small collection of executables.

Figure 2:
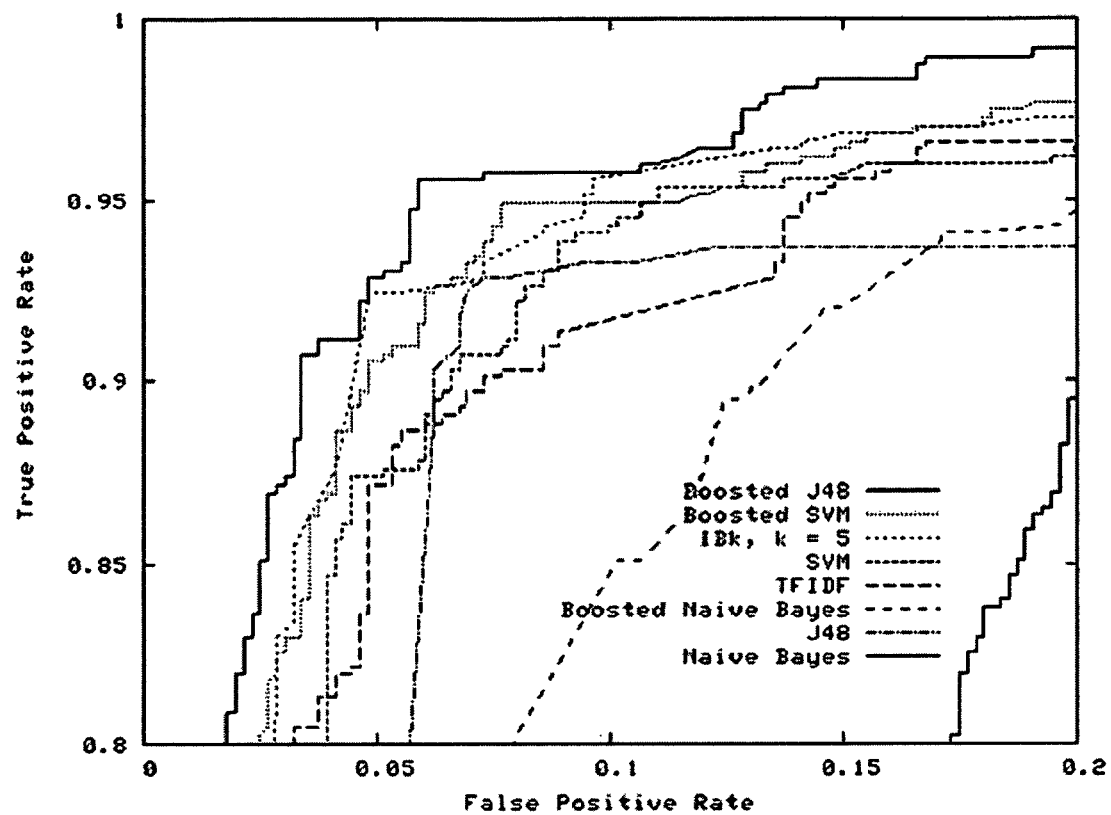
FIG. 2 is a magnified portion of the curves shown in FIG. 1.

Processing the small collection of executables produced 68,744,909 distinct n-grams. Following our experimental methodology, we used ten-fold cross-validation, selected the 500 best n-grams, and applied all of the classification methods. The ROC curves for these methods are shown in FIG. 1 (with a magnified portion shown in FIG. 2), while the areas under these curves with 95% confidence intervals are in Table 2.

As one can see, the boosted methods performed well, as did the instance-based learner and the support vector machine. Naive Bayes did not perform as well, and we discuss this further below.

With success on a small collection, we turned our attention to evaluating the text-classification methods on a larger collection of executables. As mentioned previously, this collection consisted of 1971 benign executables and 1651 malicious executables, while processing resulted in over 255 million distinct n-grams of size four. We followed the same experimental methodology—selecting the 500 top n-grams for each run of ten-fold cross-validation, applying the classification methods, and plotting ROC curves.

Figure 3:
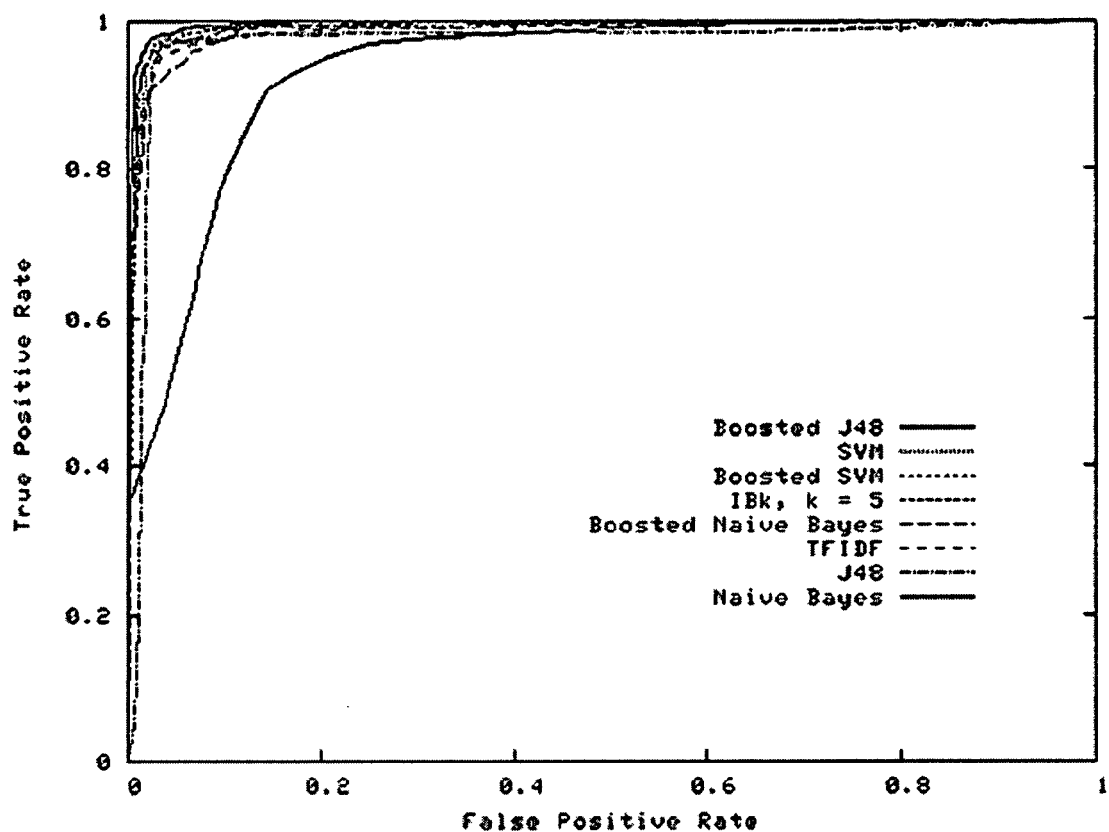
FIG. 3 shows receiver operating characteristic (ROC) curves for detecting malicious executable code in a larger collection.
Figure 4:
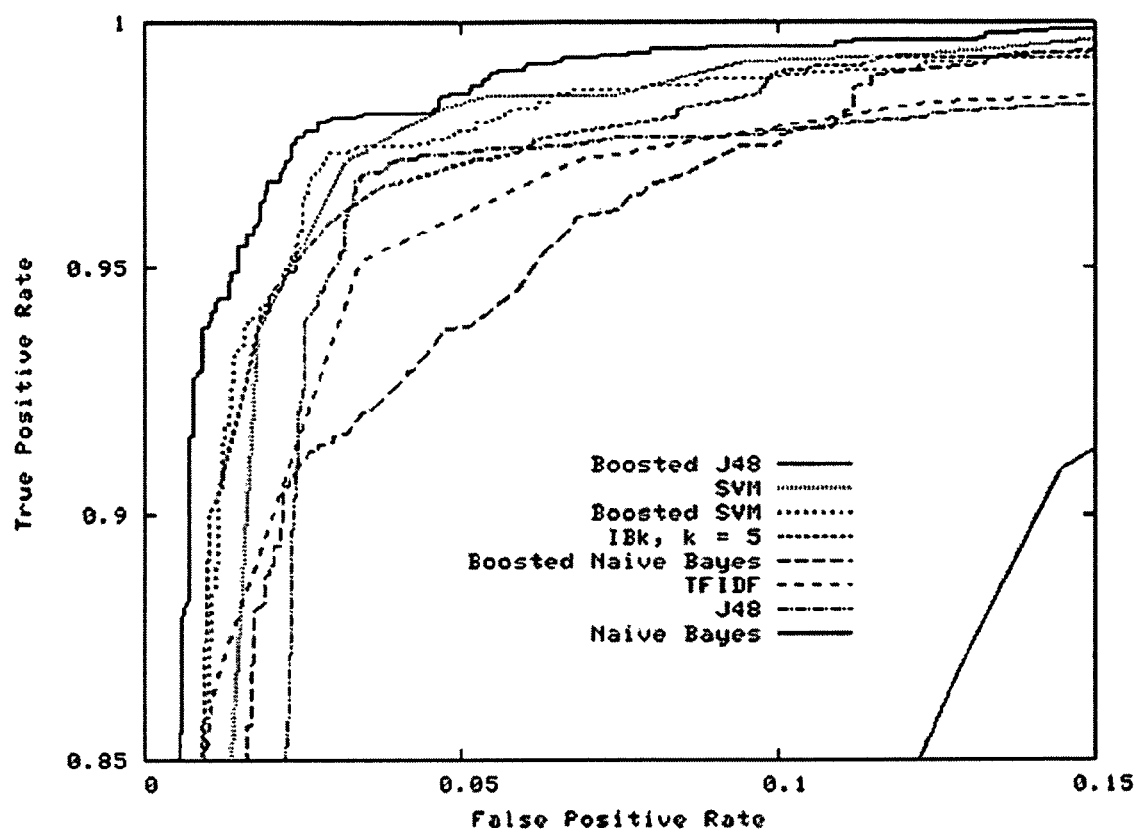
FIG. 4 is a magnified portion of the curves shown in FIG. 3.

FIG. 3 shows the ROC curves for the various methods (with a magnified portion shown in FIG. 4), while Table 3 presents the areas under these curves (AUC) with 95% confidence intervals. As one can see, boosted J48 outperformed all other methods. Other methods, such as IBk and boosted SVMs, performed comparably, but the ROC curve for boosted J48 dominated all others.

To date, our results suggest that methods of text classification are appropriate for detecting malicious executables in the wild. Boosted classifiers, IBk, and a support vector machine performed exceptionally well given our current data collection. That the boosted classifiers generally outperformed single classifiers echos the conclusion of several empirical studies of boosting, which suggest that boosting improves the performance of unstable classifiers, such as J48, by reducing their bias and variance. Boosting can adversely affect stable classifiers, such as naive Bayes, although in our study, boosting naive Bayes improved performance. Stability may also explain why the benefit of boosting SVMs was inconclusive in our study.

Our experimental results suggest that the methodology will scale to larger collections of executables. The larger collection in our study contained more than three times the number of executables in the smaller collection. Yet, as one can see in Tables 2 and 3, the absolute performance of all of the methods was better for the larger collection than for the smaller. The relative performance of the methods changed somewhat. For example, the SVM moved from fourth to second, displacing the boosted SVMs and IBk.

TABLE 2

Results for detecting malicious executables in the small collection. Areas under the ROC curve (AUC) with 95% confidence intervals.

| Method | AUC |
|---|---|
| Naive Bayes | 0.8850 ± 0.0247 |
| J48 | 0.9235 ± 0.0204 |
| Boosted Naive Bayes | 0.9461 ± 0.0170 |

TABLE 2-continued

Results for detecting malicious executables in the small collection. Areas under the ROC curve (AUC) with 95% confidence intervals.

| Method | AUC |
|---|---|
| TFIDF | 0.9666 ± 0.0133 |
| SVM | 0.9671 ± 0.0133 |
| IBk, k = 5 | 0.9695 ± 0.0129 |
| Boosted SVM | 0.9744 ± 0.0118 |
| Boosted J48 | 0.9836 ± 0.0095 |

TABLE 3

Results for detecting malicious executables in the larger collection. Areas under the ROC curve (AUC) with 95% confidence intervals.

| Method | AUC |
|---|---|
| Naive Bayes | 0.9366 ± 0.0099 |
| J48 | 0.9712 ± 0.0067 |
| TFIDF | 0.9868 ± 0.0045 |
| Boosted Naive Bayes | 0.9887 ± 0.0042 |
| IBk, k = 5 | 0.9899 ± 0.0038 |
| Boosted SVM | 0.9903 ± 0.0038 |
| SVM | 0.9925 ± 0.0033 |
| Boosted J48 | 0.9958 ± 0.0024 |

Visual inspection of the concept descriptions yielded interesting insights, but further work is required before these descriptions will be directly useful for computer-forensic experts. For instance, one short branch of a decision tree indicated that any executable with two PE headers is malicious. After analysis of our collection of malicious executables, we discovered two executables that contained another executable. While this was an interesting find, it represented an insignificantly small portion of the malicious programs.

Leaf nodes covering many executables were often at the end of long branches where one set of n-grams (i.e., byte codes) had to be present and another set had to be absent. Understanding why the absence of byte codes was important for an executable being malicious proved to be a difficult and often impossible task. It was fairly easy to establish that some n-grams in the decision tree were from string sequences and that some were from code sequences, but some were incomprehensible. For example, one n-gram appeared in 75% of the malicious executables, but it was not part of the executable format, it was not a string sequence, and it was not a code sequence.

Nonetheless, for the large collection of executables, the size of the decision trees averaged over 10 runs was about 90 nodes. No tree exceeded 103 nodes. The heights of the trees never exceeded 13 nodes, and subtrees of heights of 9 or less covered roughly 99.3% of the training examples. While these trees did not support a thorough forensic analysis, they did compactly encode a large number of benign and malicious executables.

To place our results in context with the study of Schultz et al., they reported that the best performing approaches were naive Bayes trained on the printable strings from the program and an ensemble of naive-Bayesian classifiers trained on byte sequences. They did not report areas under their ROC curves, but visual inspection of these curves suggests that with the exception of naive Bayes, all of our methods outperformed their ensemble of naive-Bayesian classifiers. It also appears that our best performing methods, such as boosted J48, outperformed their naive Bayesian classifier trained with strings.

These differences in performance could be due to several factors. We analyzed different types of executables: Their collection consisted mostly of viruses, whereas ours contained viruses, worms, and Trojan horses. Ours consisted of executables in the Windows PE format; about 5.6% of theirs was in this format.

Our better results could be due to how we processed byte sequences. Schultz et al. used non-overlapping two-byte sequences, whereas we used overlapping sequences of four bytes. With their approach it is possible that a useful feature (i.e., a predictive sequence of bytes) would be split across a boundary. This could explain why in their study string features appeared to be better than byte sequences, since extracted strings would not be broken apart. Their approach produced much less training data than did ours, but our application of feature selection reduced the original set of more than 255 million n-grams to a manageable 500.

Our results for naive Bayes were poor in comparison to theirs. We again attribute this to the differences in data extraction methods. Naive Bayes is well known to be sensitive to conditionally dependent attributes. We used overlapping byte sequences as attributes, so there were many that were conditionally dependent. Indeed, after analyzing decision trees produced by J48, we found evidence that overlapping sequences were important for detection. Specifically, some subpaths of these decision trees consisted of sequentially overlapping terms that together formed byte sequences relevant for prediction. Schultz et al.'s extraction methods would not have produced conditionally dependent attributes to the same degree, if at all, since they used strings and non-overlapping byte sequences.

Regarding our experimental design, we decided to pool a method's ratings and produce a single ROC curve because labroc4 occasionally could not fit an ROC curve to a method's ratings from a single fold of cross-validation (i.e., the ratings were degenerate). We also considered producing ROC convex hulls and cost curves, but determined that traditional ROC analysis was appropriate for our results (e.g., the curve for boosted J48 dominated all other curves).

In our study, there was an issue of high computational overhead. Selecting features was expensive, and we had to resort to a disk-based implementation for computing information gain, which required a great deal of time and space to execute. However, once selected, WEKA's Java implementations executed quickly on the training examples with their 500 binary attributes.

In terms of our approach, it is important to note that we have investigated other methods of data extraction. For instance, we examined whether printable strings from the executable might be useful, but reasoned that subsets of n-grams would capture the same information. Indeed, after inspecting some of the decision trees that J48 produced, we found evidence suggesting that n-grams formed from strings were being used for detection. Nonetheless, if we later determine that explicitly representing printable strings is important, we can easily extend our representation to encode their presence or absence. On the other hand, as we stated previously, one must question the use of printable strings or DLL information since compression and other forms of obfuscation can mask this information.

We also considered using disassembled code as training data. For malicious executables using compression, being able to obtain a disassembly of critical sections of code may be a questionable assumption. Moreover, in pilot studies, a commercial product failed to disassemble some of our malicious executables.

There are at least two immediate commercial applications of our work. The first is a system, similar to MECS, for detecting malicious executables. Server software would need to store all known malicious executables and a comparably large set of benign executables. Due to the computational overhead of producing classifiers from such data, algorithms for computing information gain and for evaluating classification methods would have to be executed in parallel. Client software would need to extract only the top n-grams from a given executable, apply a classifier, and predict. Updates to the classifier could be made remotely over the Internet. Since the best performing method may change with new training data, it will be critical for the server to evaluate a variety of methods and for the client to accommodate any of the potential classifiers. Used in conjunction with standard signature methods, these methods could provide better detection of malicious executables than is currently possible.

The second is a system oriented more toward computer-forensic experts. Even though work remains before decision trees could be used to analyze malicious executables, one could use IBk or the TFIDF classifier to retrieve known malicious executables similar to a newly discovered malicious executable. Based on the properties of the retrieved executables, such a system could give investigators insights into the new executable's function.

After evaluating a variety of classification methods, results suggest that boosted J48 produced the best classifier with an area under the ROC curve of 0.996. Our methodology resulted in a fielded application called MECS, the Malicious Executable Classification System.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

Although preferred embodiments have been shown and described, it will be appreciated by those skilled in the art that changes may be made in these embodiments without departing from the principle and spirit of the invention, the scope of which is defined in the appended claims and their equivalents.

Each patent, patent application, publication and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A computer-based method for detecting malicious executable code, the method comprising:
    establishing a database of malicious and benign executables, wherein each executable comprises executable code;
    extracting respective byte code sequences from each of the executables;
    creating a file of extracted byte code sequences for each of the executables;
    constructing n-grams from the byte codes in each of the created files, said n-grams comprising two or more adjacent bytes from a respective one of the byte code sequences and sharing at least one overlapping byte with another of said n-grams from said respective byte code sequence;
    selecting a plurality of the most relevant n-grams from each of the created files based on a predetermined criteria of relevance between the n-grams within the created files;
    creating vectors for each created file, based on the presence or absence of relevant n-grams in each file;
    producing a set of training data by labeling each created vector as either malicious or benign;
    applying one or more classification methods to the set of training data to produce a set of classifiers and a set of pooled case ratings;
    selecting the optimal classifier from the produced set of classifiers;
    reapplying the one or more classification methods to the produced set of training data to produce a detection classifier; and
    applying the detection classifier to an executable to determine whether the executable comprises malicious executable code.

2. The method according to claim 1, including calculating the information gain of each distinct constructed n-gram.

3. The method according to claim 1, wherein the predetermined criteria is determined with pilot studies.

4. The method according to claim 1, wherein each created vector is labeled as malicious or benign based on the type of executable from which the vector originated.

5. The method according to claim 1, wherein the one or more classification methods is selected by a user.

6. The method according to claim 1, including selecting the classification method with the maximum average area under the ROC curve.

7. The method according to claim 6, wherein the classification method is selected by use of analysis software.

8. The method according to claim 7, wherein the analysis software is labroc4.

9. The method according to claim 1, wherein the step of applying one or more classification methods is performed by use of an evaluation methodology.

10. The method according to claim 9, wherein the evaluation methodology is a ten-fold validation technique.

11. The method according to claim 1, wherein the optimal classifier is selected based on user-defined preferences.

12. The method according to claim 1, wherein the one or more classification methods is reapplied using parameters of the selected optimal classifier.

13. The method according to claim 1, wherein the steps of detecting malicious executable code can be repeated with the addition of new executables and/or new classification methods.

14. A computer-based method for detecting malicious executable code, comprising:
    creating a set of training data, including a detection classifier;
    converting a questionable binary stream into ASCII byte codes;
    creating n-grams from the ASCII byte codes, said n-grams comprising two or more adjacent bytes from a respective one of the ASCII byte codes and sharing at least one overlapping byte with another of said n-grams from said respective ASCII byte code;
    extracting a plurality of the created n-grams based on the relevance between said n-grams and the created training data;
    creating a feature vector based on the presence or absence of the most relevant n-grams; and
    applying the detection classifier to the created feature vector to determine whether the questionable binary stream comprises malicious executable code.

15. A non-transitory computer-readable medium encoded with software for detecting malicious executable code, wherein the software is provided for:
    creating a set of training data, including a detection classifier;
    converting a questionable binary stream into ASCII byte codes;
    creating n-grams from the ASCII byte codes, said n-grams comprising two or more adjacent bytes from a respective one of the ASCII byte codes and sharing at least one overlapping byte with another of said n-grams from said respective ASCII byte code;
    extracting a plurality of the most created n-grams based on the relevance between said n-grams and the created training data;
    creating a feature vector based on the presence or absence of the most relevant n-grams; and
    applying the detection classifier to the created feature vector to determine whether the questionable binary stream comprises malicious executable code.

16. A method for detecting malicious executable code, comprising:
    extracting a plurality of byte code sequences from a plurality of reference programs stored in a database, said reference programs being stored in association with information identifying the reference programs as malicious or benign;
    generating a plurality of byte code sequence sets, said sets including byte code sequences extracted from a respective program in the plurality of programs;
    generating sets of n-grams corresponding, respectively, to the plurality of byte code sequence sets, said n-grams comprising two or more adjacent bytes from a respective one of the byte code sequence sets and sharing at least one overlapping byte with another of said n-grams from said respective byte code sequence set;
    selecting subsets of the sets n-grams generated based on the relevance of said n-grams with respect to a sample program;

generating a plurality of vectors for the plurality of byte code sequence sets based on the presence or absence of relevant n-grams in said sets;

storing in a memory device the plurality of vectors in association with information identifying the created vectors as either malicious or benign based on identification information of the corresponding programs stored in the database;

generating a set of classifiers and a set of pooled case ratings, said set of classifiers and said set pooled case rating being generated by classifying the stored the stored vectors using at least one classification method;

selecting an optimal classifier from the produced set of classifiers based on the similarity between the classifier and the sample program;

generating a detection classifier by reclassifying the stored the stored vectors using the at least one classification method; and applying the detection classifier to a test program to determine whether the test program comprises malicious executable code.

17. The method of claim 1, wherein constructing an n-gram comprises combining a series of bytes selected from the byte codes sequences into a single term, said the series of bytes being selected by repeatedly making byte-shifted selections of a predetermined number of bytes from the byte code sequence.

18. The method of claim 14, wherein constructing an n-gram comprises combining a series of bytes selected from the corresponding ASCII byte code into a single term, said series of bytes being selected by repeatedly making byte-shifted selections of a predetermined number of bytes from the ASCII byte code.

19. The method of claim 15, wherein creating an n-gram comprises combining a series of bytes selected from the corresponding ASCII byte code into a single term, said series of bytes being selected by repeatedly making byte-shifted selections of a predetermined number of bytes from the ASCII byte code.

* * * * *